United States Patent [19]
Cox

[11] 3,868,428
[45] Feb. 25, 1975

[54] PROCESS AND APPARATUS FOR THE DEHYDROGENATION OF ALKYLATED AROMATIC HYDROCARBONS

[75] Inventor: Robert P. Cox, Wyckoff, N.J.

[73] Assignee: The Lummus Company, Bloomfield, N.J.

[22] Filed: Apr. 12, 1973

[21] Appl. No.: 350,529

[52] U.S. Cl. ............................................. 260/669 R
[51] Int. Cl. ........................................... C07c 15/10
[58] Field of Search ................................ 260/669 R

[56] References Cited
UNITED STATES PATENTS

| | | |
|---|---|---|
| 2,851,502 | 9/1958 | Bowman et al. ................ 260/669 R |
| 3,118,006 | 1/1964 | Lovett et al. ..................... 260/669 R |
| 3,326,996 | 6/1967 | Henry et al. ..................... 260/669 R |
| 3,498,756 | 3/1970 | Carson ............................. 260/669 R |
| 3,660,510 | 5/1972 | Kindler et al. .................. 260/669 R |
| 3,702,346 | 11/1972 | Kellar .............................. 260/669 R |
| 3,755,482 | 8/1973 | Nunnaly et al. ................. 260/669 R |

Primary Examiner—C. R. Davis
Attorney, Agent, or Firm—Marn & Jangarathis

[57] ABSTRACT

A reactor system for effecting dehydrogenation reactions is disclosed comprised of an adiabatic reactor and a non-adiabatic reactor wherein the reactants are serially passed therethrough with the reactants being heated during passage through the latter reactor.

7 Claims, 1 Drawing Figure

PROCESS AND APPARATUS FOR THE DEHYDROGENATION OF ALKYLATED AROMATIC HYDROCARBONS

This invention relates to an improved process and apparatus for the dehydrogenation of alkylated aromatic hydrocarbons, and more particularly to an improved process and apparatus for the catalytic dehydrogenation of ethylbenzene to styrene.

The dehydrogenation of an alkylated aromatic hydrocarbon is a strongly endothermic reaction. Therefore, the amount of the hydrocarbon dehydrogenated is dependent upon the amount of heat supplied to the reactor per unit of the alkylated aromatic hydrocarbon. Generally, two forms of reactor systems are presently used. One form of reactor system includes a massive fixed bed of catalyst wherein the heat of reaction is solely supplied by superheated steam admixed with the hydrocarbon feed, such as disclosed in U.S. Pat. No. 3,326,996 to Henry, et al. With this form of reactor system (which is more common), the heat input and therefore conversion of the alkylated hydrocarbon may be increased by increasing the amount or temperature of the superheated steam admixed with the feed to the reactor. The other form of reactor system includes a reactor of the shell and tube type with heat being supplied through the tube walls from a fluid heat transfer medium.

Higher reaction temperatures favor greater equilibrium conversion as well as increased reaction rates. High initial temperatures increase undesirable thermal and catalytic side reactions with a concomitant reduction in selectivity. Thus, conversion rates and selectivity have been limited by large high temperature considerations and the unfeasibility of preheating the reactant above a certain level. While more recent processes have employed serially aligned reactors with improved conversion rates, selectivity has remained substantially constant.

Objects of the Invention

An object of the present invention is to provide an improved reactor system for the dehydrogenation of an alkylated hydrocarbon.

A further object of the present invention is to provide an improved reactor system for the dehydrogenation of an alkylated hydrocarbon whereby selectivity and conversion to the desired product is increased thereby reducing purification costs.

Still another object of the present invention is to provide an improved reactor system for the dehydrogenation of ethylbenzene to styrene.

A still further object of the present invention is to provide an improved reactor system for hydrocarbon whereby selectivity to the desired product is increased.

Summary of the Invention

These and other objects of the present invention are achieved by providing a process and apparatus including a reactor system comprised of an adiabatic reactor and a non-adiabatic reactor wherein the reactants are serially passed through the adiabatic reactor and thence through the non-adiabatic reactor with the temperature of the reactants being increased during passage through the latter reactor.

Brief Description of the Drawing

These and other objects of the present invention will become more readily understood by reference to the accompanying drawing which is a schematic flow diagram of a reactor system of the present invention.

Detailed Description of the Invention

Figure 1:
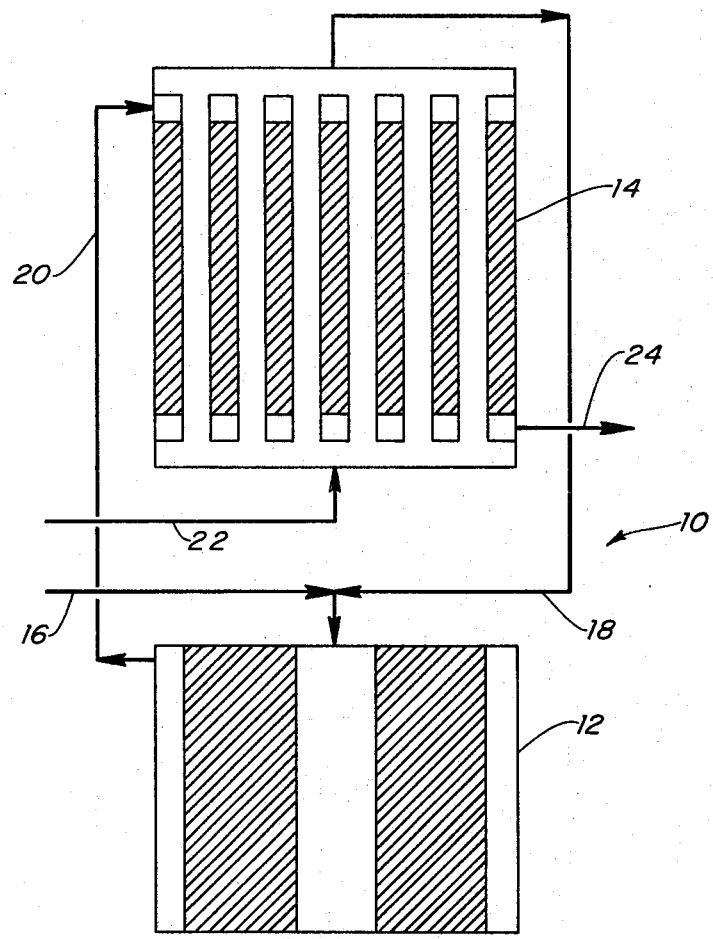

Referring now to the drawing, there is illustrated a preferred embodiment of the reactor system of the present invention, generally indicated as 10, comprised of an adiabatic reactor 12 and a non-adiabatic reactor 14. The reactor 12 is of the axial flow type or the radial flow type, such as disclosed in U.S. application Ser. No. 234,831 filed Mar. 15, 1972 and assigned to the same assignee. The non-adiabatic reactor 14 is of the shell and tube type to provide for the indirect contact of rectants and a heat transfer medium, and may be of the countercurrent type, co-current type or a combination thereof. Such a heat transfer medium may include steam or other suitable gases for heating duty at elevated temperatures, i.e., above 1,400°F. The catalyst for reactor 14 may be placed either within or outside of the tubes as long as means are provided for the facile charging and discharing of catalyst therefrom.

In operation, the feed, such as ethylbenzene, in line 16 is admixed with steam as a diluent in line 18 in a weight ratio of about 1.3:1 to 3.8:1 is introduced into reactor 12 at a temperature of from about 900° to 1,500°F. and at a pressure of from about 1 to 30 psia. A reactor effluent comprised of styrene, unreacted ethylbenzene and minor quantities of impurities is withdrawn from reactor 12 by line 20. About 30 to 60 percent of the ehtylbenzene is converted with about a 50° to 180°F. temperature drop across reactor 12.

The reactor effluent in line 20 is introduced into the shell side of reactor 14 and is passed in indirect contact with a heat transfer medium, such as superheated steam, at a temperature of from 1,200° to 1,500°F., introduced into the reactor 14 by line 22. A reactor effluent is withdrawn from reactor 14 by line 24 and is passed to subsequent processing operation (not shown) for purification. In reactor 14, a temperature rise is provided equal to or greater than the temperature drop in reactor 12 to achieve increased conversion (single pass) at constant selectivity, such as 85 percent conversion at 90 percent selectivity.

In carring out the process of the present invention, conditions may be widely varied. The dehydrogenation reaction may be carried out at any temperature in the range from about 900° to about 1,500°F., and at a pressure of from about 1 psia. to about 30 psia. It is advantageous, however, to maintain the pressure as low as possible with atmospheric pressure being generally employed. A preferred temperature range is from about 1,025°F. to about 1,300°F. Steam is utilized in an amount from about 1 to about 30 moles per mole of ethylbenzene.

The size and shape of catalyst particles is not critical and may be varied over reasonable ranges. The catalyst may be used in the form of pellets, tablets, spheres, pills, saddles, powder, etc. Symmetrical pellets of from about 1/50 of an inch to about 3/4 of an inch in diameter and from about 1/16 of an inch to 1 inch in length. are generally satisfactory.

The catalyst usually contains as primary active constituent, metals of Groups IV to VIII of the Periodic Table, either in their free form, or preferably in the form of various of their compounds, such as the oxides, sulfides, phosphates, etc. Generally, mixtures of two, three or more of such compounds are employed. Typical catalysts are formed from iron oxide, a small amount of another metallic oxide, and a small amount of an alkali metal compound as a promoter. Some of the catalysts are autoregenerative under conditions at which the dehydrogenation reaction is effected, i.e., they are capable of being continuously regenerated under the conditions of the reaction, thereby obviating the necessity for regeneration including the step of burning carbon deposits off the surface of the catalyst particles.

The present invention, while described with reference to the dehydrogenation of ethylbenzene to form styrene, is applicable to endothermic dehydrogenation reactions generally including butanes to butadiene, isoamylenes to isoprene, etc.

While the invention has been described in connection with an embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A process for effecting the catalytic dehydrogenation of an alkylated hydrocarbon, which comprises:
   a. passing an alkylated hydrocarbon and a diluent gas through a catalytic adiabatic reaction zone operated at an inlet temperature from about 900°F. to about 1,500°F.;
   b. withdrawing an effluent from said adiabatic reaction zone, said effluent being at a temperature less than said inlet temperature;
   c. passing said effluent through a catalytic non-adiabatic reaction zone, said effluent being heated, by indirect heat transfer, during passage therethrough to effect a temperature rise through said non-adiabatic reaction zone at least about equal to the temperature decrease through said adiabatic reaction zone.

2. The process as defined in claim 1 wherein said alkylated hydrocarbon is ethylbenzene and said diluent gas is steam.

3. The process as defined in claim 2 wherein ethylbenzene is admixed with steam at a ratio of from about 1.3:1 to 3.8:1.

4. The process as defined in claim 1 wherein the reaction is effected at pressures of from 1 to 30 psia.

5. The process as defined in claim 2 wherein the steam is at a temperature of from about 1,200° to 1,500°F.

6. The process of claim 1 wherein from about 30 to about 60 percent of the ethyl benzene is converted in said adiabatic reaction zone.

7. The process of claim 6 wherein the temperature drop through said adiabatic reaction zone is from about 50°F to about 180°F.

* * * * *